United States Patent
Utagawa et al.

(10) Patent No.: US 8,411,613 B2
(45) Date of Patent: Apr. 2, 2013

(54) WIRELESS COMMUNICATION NETWORK SYSTEM

(75) Inventors: Hitoshi Utagawa, Koganei (JP); Toshiaki Matsui, Koganei (JP)

(73) Assignee: National Institute of Information and Communications Technology, Koganei-shi (JP)

(*) Notice: Subject to any disclaimer, the term of this patent is extended or adjusted under 35 U.S.C. 154(b) by 254 days.

(21) Appl. No.: 12/680,461

(22) PCT Filed: Sep. 26, 2008

(86) PCT No.: PCT/JP2008/068005
§ 371 (c)(1),
(2), (4) Date: Jul. 19, 2010

(87) PCT Pub. No.: WO2009/041736
PCT Pub. Date: Feb. 4, 2009

(65) Prior Publication Data
US 2010/0315990 A1    Dec. 16, 2010

(30) Foreign Application Priority Data
Sep. 28, 2007 (JP) .................. 2007-254119

(51) Int. Cl.
*H04B 7/14* (2006.01)
(52) U.S. Cl. ............... 370/315; 455/7; 455/20; 455/23; 455/73; 455/84; 455/91; 455/101; 455/103; 455/130; 455/132
(58) Field of Classification Search ......... 370/315–327; 455/20, 73, 84, 23, 101, 103, 132, 129
See application file for complete search history.

(56) References Cited

U.S. PATENT DOCUMENTS

| | | | |
|---|---|---|---|
| 5,982,245 | A | 11/1999 | Matsui et al. |
| 6,246,295 | B1* | 6/2001 | Matsui et al. .............. 331/99 |
| 7,295,806 | B2 | 11/2007 | Corbett et al. |
| 8,160,492 | B2* | 4/2012 | Matsui et al. .............. 455/23 |
| 2003/0224743 | A1* | 12/2003 | Okada et al. .............. 455/127.2 |
| 2005/0277443 | A1* | 12/2005 | Ozluturk .................. 455/562.1 |
| 2009/0253370 | A1 | 10/2009 | Matsui et al. |

FOREIGN PATENT DOCUMENTS

| EP | 0 296 838 A2 | 12/1988 |
|---|---|---|
| EP | 1 037 307 A2 | 9/2000 |

(Continued)

OTHER PUBLICATIONS

U.S. Appl. No. 13/121,063, filed Jun. 13, 2011, Utagawa, et al.

(Continued)

*Primary Examiner* — Charles C Jiang
(74) *Attorney, Agent, or Firm* — Oblon, Spivak, McClelland, Maier & Neustadt, L.L.P.

(57) ABSTRACT

This inventive wireless communication system comprises a plurality of wireless communication devices (101) each including a radiating oscillator (1), a baseband signal generating unit (4) and a reception signal detecting unit (7). In this wireless communication network system, the wireless communication devices are arranged to face each other at a location where a pull-in phenomenon is caused, a signal transmitted from one of the wireless communication devices is an oscillation signal of the radiating oscillator (1) of the one of the wireless communication devices, the frequency of the oscillation signal varies with the baseband signal, the variation in the frequency is transmitted to the other ones of the facing wireless communication devices (102) by the pull-in phenomenon, the oscillation frequencies of the radiating oscillators (2, 3) of the other ones of the facing wireless communication devices (102) also vary, and the other ones of the facing wireless communication devices (102) extract the variation by receiving the variation in the frequency through the reception signal detecting units (8). As a result, the present invention can provide a less expensive wireless network system which comprises wireless communication devices having respectively a very simple structure, consumes less electric power and can secure high-quality signal transmission.

6 Claims, 9 Drawing Sheets

FOREIGN PATENT DOCUMENTS

| | | |
|---|---|---|
| EP | 1 037 307 B1 | 11/2004 |
| GB | 2 389 255 A | 12/2003 |
| JP | 2666880 | 6/1997 |
| JP | 11-31918 | 2/1999 |
| JP | 3146260 | 1/2001 |
| JP | 3355337 | 10/2002 |
| JP | 2003-198259 | 7/2003 |
| JP | 2003-244016 | 8/2003 |
| JP | 2004-357134 A | 12/2004 |
| JP | 357134 | 12/2004 |
| JP | 2005-348332 | 12/2005 |
| WO | WO 2007/114522 A1 | 10/2007 |

OTHER PUBLICATIONS

U.S. Appl. No. 13/123,338, filed Jul. 5, 2011, Utagawa, et al.

U.S. Appl. No. 13/123,115, filed Jul. 12, 2011, Utagawa, et al.

U.S. Appl. No. 13/123,135, filed Apr. 7, 2011, Utagawa, et al.

Robert A. Flynt, et al., "Low Cost and Compact Active Integrated Antenna Transceiver for System Applications", IEEE Transactions on Microwave Theory and Techniques, vol. 44, No. 10, Oct. 1996, pp. 1642-1649.

C. M Montiel, et al., "A Self-Mixing Active Antenna for Communication and Vehicle Identification Applications", IEEE MTT-S Digest, 1996. pp. 333-336.

Chinese Office Action Issued Jul. 18, 2012 in Patent Application No. 200880109015.4.

Extended European Search Report issued Dec. 13, 2012 in Patent Application No. 08834453.6.

\* cited by examiner

WIRELESS COMMUNICATION NETWORK SYSTEM

TECHNICAL FIELD

The present invention relates to a wireless communication network system that mutually relays and transmits various types of signals with high quality.

BACKGROUND ART

As wireless communication systems for transmitting wideband digital signals such as video information or the like with high quality, wireless LAN and wireless video transmitting systems using microwaves or millimeter waves have been developed. Further, a sensor network configuration using a wireless system is being considered, in view of monitoring control in smaller factories or large-scale production facilities, anticrime monitoring for facilities, disaster-prevention monitoring for depopulated regions, and the like.

In a conventional wireless communication device, a transmitter side performs a modulating process or the like at an intermediate frequency of several tens of megahertz to several hundreds of megahertz or, in some cases, at an intermediate frequency in a several-GHz band at which signal processing can be easily performed. The transmitter side synthesizes the signal with a signal transmitted from a local oscillator to convert (up-convert) the frequency of the resultant signal into a transmission frequency in a 60-GHz band, for example. The transmitter side then emits the signal from an antenna through an electric supply line. A receiver side amplifies a wireless frequency signal transmitted from a receiving antenna, and synthesizes the amplified signal with a signal transmitted from the local oscillator to convert (down-convert) the frequency of the resultant signal into an intermediate frequency band. The receiver side then performs channel extraction and signal demodulation. This configuration is accompanied with a technical difficulty due to higher frequencies, and has problems such as deterioration of the efficiency of a local oscillator that is required to have a highly-stable and sufficiently large output, and deterioration of the efficiency of a wireless device such as a loss in a frequency converter. Furthermore, an increase in cost is a considerable obstruction to practical and wide use of wireless communication networks.

To address these disadvantages, attempts have been made to develop an active antenna in which an antenna and a wireless frequency circuit section are integrated to lower the costs, and there has been proposed a configuration of a radiating oscillator in which an amplifier element and an electromagnetic wave radiating structure are integrated with each other. The structure of this radiating oscillator is very simple, and is expected to be applied as a component of a low-cost wireless communication network.

Example configurations of wireless communication networks include Bluetooth which has already been put into practical use, and a series of IEEE 802.11 wireless standards known by the name of Wi-Fi. On the other hand, although the speed is a hundred times as low as the speed of the above-mentioned configurations, ZigBee, which is supposed to be able to form a network with lower power consumption and at low costs, is also being widely used as new means.

ZigBee is a technique compliant with the standard of IEEE 802.15.4 and is attractive as a short-distance, low-speed wireless link. In terms of the use of frequency, however, ZigBee is a wireless system of a 2.4 GHz band that is considerably congested in recent years, like Bluetooth or Wi-Fi.

On the other hand, when wideband digital information transmission by a 60-GHz-band millimeter wave which is high frequency is to be performed, if the phase noise and frequency stability of the local oscillator of the frequency converter are not sufficient, wideband digital signals cannot be transmitted with high quality due to frequency drift and phase noise. To counter this problem, a self-heterodyne wireless communication device technique and a wireless system configuration technique based thereon have been disclosed (see JP-A No. 2005-348332 (Patent Document 1) and JP-A No. 2003-198259 (Patent Document 2)).

In the self-heterodyne schemes disclosed in Patent Documents 1 and 2, although a local oscillator used in a transmitter is inexpensive and is of unstable frequency, a frequency shift or phase noise caused by the local oscillator is completely canceled at the time of signal detection, and it has been confirmed that signals are appropriately transmitted to a millimeter-wave-band wireless LAN or a wireless video transmission system which strictly requires phase noise and frequency stability.

Further, JP-A No. 2003-244016 (Patent Document 3) discloses frequency re-conversion required for configuring a wireless communication network system that is used for a relay to another system, for example. More specifically, a conversion to an intermediate frequency is once made and then re-conversion into a wireless transmission frequency is performed. At this point, however, deterioration in the quality of wideband digital signals is caused due to frequency drift and phase noise, if the phase noise or frequency stability of the local oscillator of the frequency converter is not sufficient. To counter this problem, a technique for configuring a system that wirelessly supplies a highly-stable reference signal has been disclosed.

JP Patent No. 3146260 (Patent Document 4), JP Patent No. 3355337 (Patent Document 5), and a document by R. A. Flynt, J. A. Navarro and K. Chang, 'Low Cost and Compact Active Integrated Antenna Transceiver for System Application', IEEE Trans. Microwave Theory Tech., Vol. 44, pp. 1642-1649, 1996 (Non-patent Document 1) disclose examples of radiating oscillators which respectively have a structure of a planar resonator using a transistor as a negative resistance amplifier. Non-patent Document 1 discloses a structure of a two-way transmission equipment in which radiating oscillators are arranged to face one another so that transmission/reception signals are polarized waves orthogonal to one another. According to Non-patent Document 1, this two-way transmission equipment is operated as a receiver by a mixer diode for frequency conversions.

Further, a document by C. M. Montiel, L. Fan and K. Chang, 'A Self-Mixing Active Antenna for Communication and Vehicle Identification Applications', 1996 IEEE MTT-S Digest, TU4C pp. 333-336, 1996 (Non-patent Document 2) discloses a technique by which a Gunn diode is used as an oscillation element. By this technique, a high-frequency voltage is superposed on a bias voltage of the Gunn diode to cause frequency modulation, and the modulated frequency is applied to another Gunn diode oscillator manufactured in the same manner. Accordingly, an injection synchronization phenomenon is caused. At the same time, the frequency modulation component is transmitted to another radiating oscillator, and, although two-way transmission and reception cannot be simultaneously performed through a mixer operation of the Gunn diode itself, a high-frequency signal component can be transferred.

As described above, the following techniques are being developed: a sensor network which avoids a large number of unsolved problems such as the problem of interference with an existing congested wireless system and the problems of interference and coexistence due to the high-density arrangement of wireless devices, and covers a large number of observation points in a wide region; a new wireless device technique for realizing a simple wireless communication network; and a wireless communication network configuration technique using the new wireless device technique.

However, by the conventional wireless device technique and the conventional wireless communication network configuration technique, the structures are complicated. As a result, the costs become higher, and there are problems in power consumption and signal quality. Those problems obstruct practical and wide use of wireless communication networks.

The present invention has been made in view of the above circumstances, and an object thereof is to provide a wireless communication network system of a superhigh-frequency band to a millimeter-wave band that is suitable for a wireless communication system configuration and that has a very simple structure as the structure of a basic wireless communication device, attaining reduced costs and power consumption and high-quality signals.

DISCLOSURE OF THE INVENTION

The present invention is as follows:

(1) A wireless communication network system that mutually relays and transmits various types of signals comprises a plurality of wireless communication devices each including: a radiating oscillator configured to integrate a transistor into a superhigh-frequency oscillating resonator to generate a negative resistance and to share the function of an antenna that radiates an electromagnetic wave to space; a baseband signal generating unit that outputs a baseband signal to the radiating oscillator; and a reception signal detecting unit that receives a transmitted signal. In this wireless communication network system, the wireless communication devices are arranged to face each other at a location where a pull-in phenomenon is caused, a signal transmitted from one of the wireless communication devices is an oscillation signal of the radiating oscillator of the one of the wireless communication devices, the frequency of the oscillation signal varies with the baseband signal, the variation in the frequency is transmitted to the other ones of the facing wireless communication devices by the pull-in phenomenon, the oscillation frequencies of the radiating oscillators of the other ones of the facing wireless communication devices also vary, and the other ones of the facing wireless communication devices extract the variation by receiving the variation in the frequency through the reception signal detecting units.

(2) In the wireless communication network system described in (1), each of the wireless communication devices has one or more directional beams.

(3) In the wireless communication network system described in (1) or (2), each of the wireless communication devices has one or more directional beams, and has a function to change the direction(s) of the beam(s) and the equivalent isotropic radiated power.

(4) In the wireless communication network system described in any of (1) to (3), at least one of the wireless communication devices does not include both of or one of the baseband signal generating unit and the reception signal detecting unit.

(5) In the wireless communication network system described in any of (1) to (4), each of the baseband signal generating units of the wireless communication devices has a function to superpose a unique address signal, and is configured to be capable of determining which one of the wireless communication devices has generated a signal.

(6) In the wireless communication network system described in any of (1) to (5), each of the baseband signal generating units of the wireless communication devices has a function to connect to a signal from various sensors or another sensor network and transfer the acquired data of the signal.

(7) The wireless communication network system described in any of (1) to (6) is connected to a cable network or another wireless communication network, and is integrally controlled and managed.

According to the present invention, the radiating oscillators provided in the respective wireless communication devices are in synchronization with each other in an operating state, by virtue of a pull-in phenomenon. When a signal from one baseband signal generating unit is input to a radiating oscillator, the signal changes the frequency of the oscillation signal of the radiating oscillator, and the frequency-modulated oscillation signal is transmitted as an electric wave and is shared in a wireless communication network. At this point, the radiating oscillator functions as a wireless communication device on the information transmission side, and the other wireless communication devices function as wireless communication devices on the information reception side. The oscillation frequencies of the radiating oscillators provided in the wireless communication devices on the information reception side vary similarly to the changes in frequency of the radiating oscillator provided in the wireless communication device on the information transmission side as a result of synchronization due to the pull-in phenomenon. In this manner, information is transmitted from the information transmission side to the information reception side. In the reception signal detecting units of the wireless communication devices on the information reception side, the information corresponding to the source baseband signal is received based on the variation in frequency. In the wireless communication network system according to the present invention, signal frequency conversions (up-conversions and down-conversions) are not performed through mixer operations, and the synchronization itself among the radiating oscillators by virtue of a pull-in phenomenon is utilized as an information sharing means in the network. Accordingly, relatively high-quality information transmission can be performed with a very simple structure. Furthermore, in a planar radiating oscillator that has a transistor satisfying the negative resistance oscillating conditions, it is possible to expect efficiency 20 to 30 times as high as the efficiency obtained in a case where a Gunn diode is used, and the power consumption can be reduced. Accordingly, the planner radiating oscillator can provide wireless communication devices as inexpensive components that can operate with batteries, and practical use of wireless communication network systems comprising the wireless communication devices can be expected.

By appropriately selecting a structure for the radiating oscillators and a radiator structure to be provided in wireless communication devices, output beams can be shaped into one-side direction beams, two-way beams, and multibeams, and those beams are combined to allow a high degree of freedom in designing a network through arrangement of the radiating oscillators. Accordingly, it is possible to provide a technique that has high practicality in the formation of wireless links under complicated installation conditions in many sensor networks, security networks, communication control networks, and the like. Such a technique can be applied to various fields. In particular, the formation of a wireless communication network of a millimeter-wave band with the use of modules having highly-directional beams avoids the problem of interference with other wireless systems. Such a wireless communication network is suitable for sharing frequencies, and is effective in efficient use of frequency resources.

In the wireless communication network system, each of the wireless communication devices may have one directional beam or a plurality of directional beams, and have a function to change the direction(s) of the beam(s) and the equivalent isotropic radiated power. In that case, synchronization caused by a pull-in phenomenon can be secured or cancelled in a variable manner in each wireless communication device, and the information transmission route and the information transmitting direction can be changed in the wireless communication network. Accordingly, a more flexible network can be effectively formed.

Further, a wireless communication device that does not include both of or one of a baseband signal generating unit and a reception signal detecting unit may be provided in the wireless communication network, and the wireless communication device may serve as a wireless communication device only having a relay function, an information transmitting function, or an information receiving function, as needed. In this manner, a wireless communication network system can be formed with a minimum hardware structure that has no unnecessary parts and is suitable for the intended use.

Since an address is described for each radiating oscillator, it is easy to identify which part of the wireless communication network system according to the present invention the signal information is transmitted from.

Furthermore, each of the baseband signal generating units of more than one wireless communication devices may have a function to connect to a signal transmitted from various sensors or another sensor network, and transfer the acquired data of the signal. With this arrangement, it is possible to realize a high-quality sensor network of a superhigh-frequency band to a millimeter-wave band that consumes less electric power and is less expensive.

The wireless communication network system according to the present invention may be connected to a network of another kind. In such a case, the wireless communication network system is expected to exert a wider variety of functions.

More than one wireless communication network structures according to the present invention may be combined and be connected to a cable network or another wireless communication network. In such a case, it is possible to obtain a network system that is integrally managed and controlled as a high-order system.

BEST MODE FOR CARRYING OUT THE INVENTION

Embodiments of the present invention will be described below with reference to the accompanying drawings.

Figure 1:
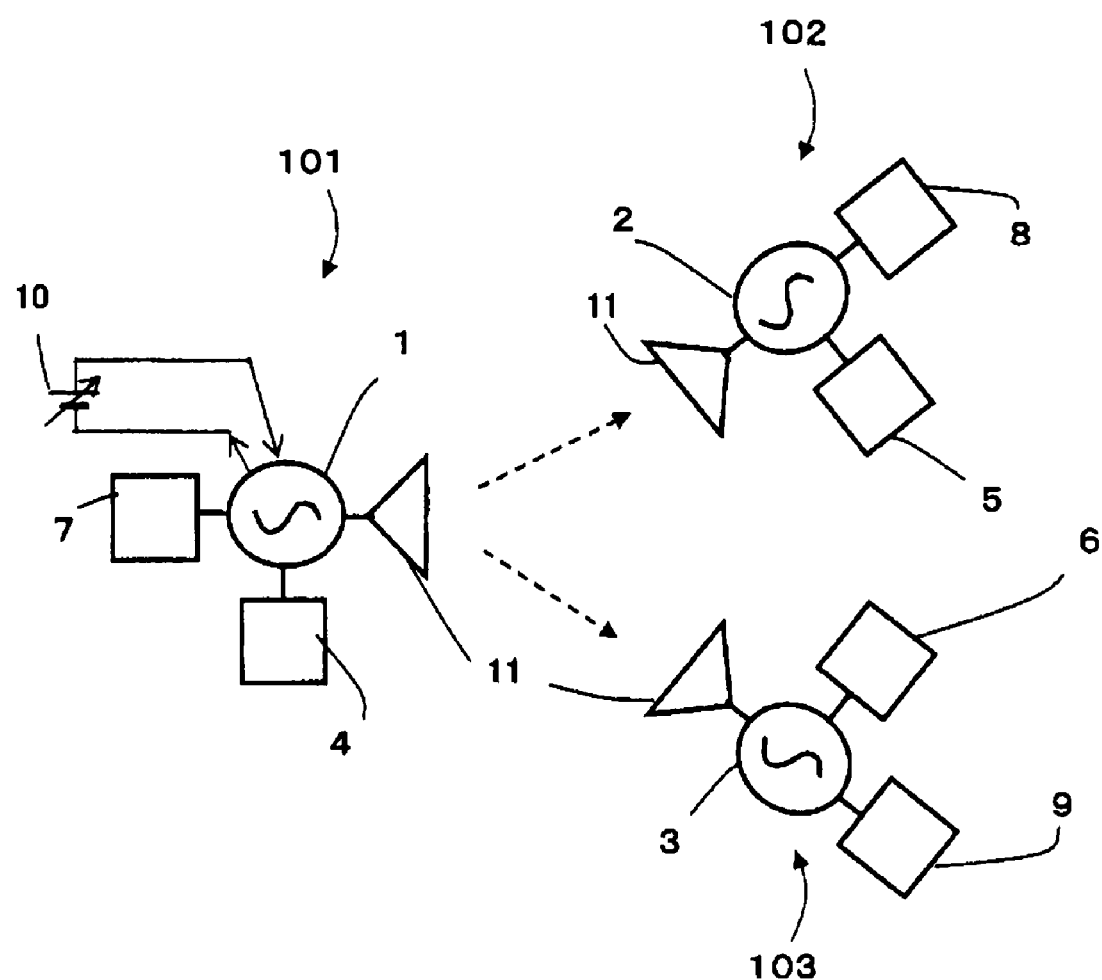
FIG. 1 is a block diagram showing a principle of a wireless communication network system according to the present invention.
Figure 2A:
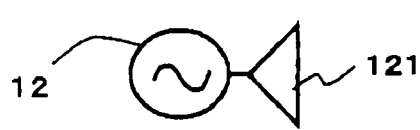
FIGS. 2(a), 2(b), 2(c), 2(d), and 2(e) are explanatory diagrams of radiating oscillators that are components of a wireless communication network system according to the present invention, each having one or more directional beams.
Figure 2A:
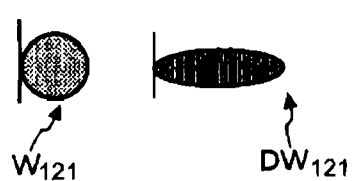
Figure 2B:
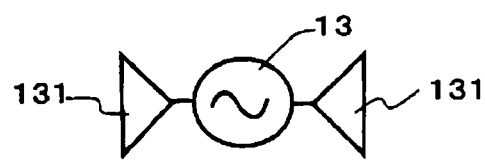
Figure 2B:
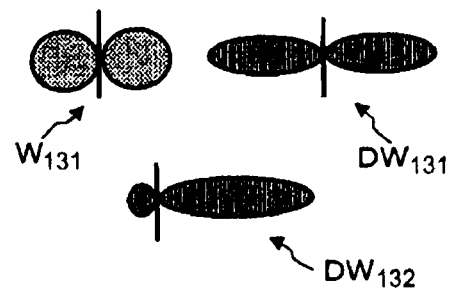
Figure 2C:
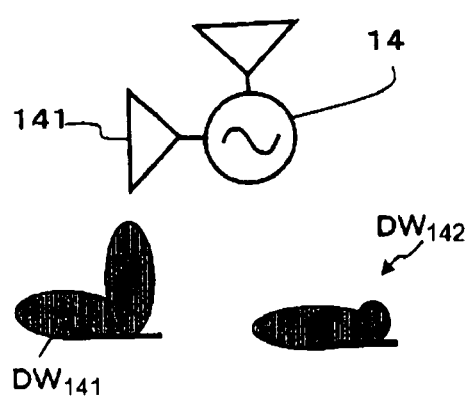
Figure 2D:
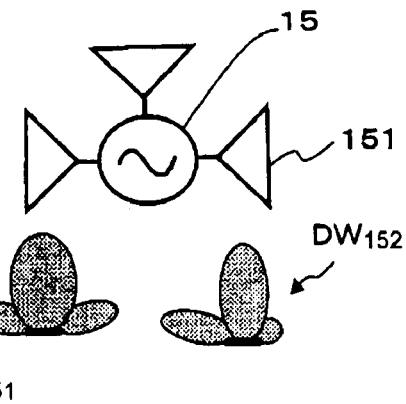
Figure 2E:
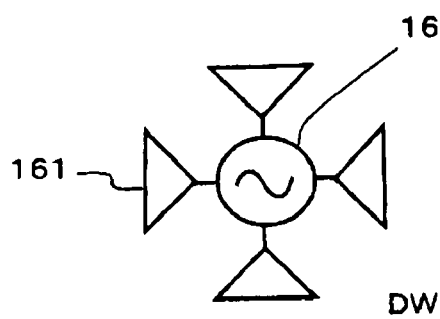
Figure 2E:
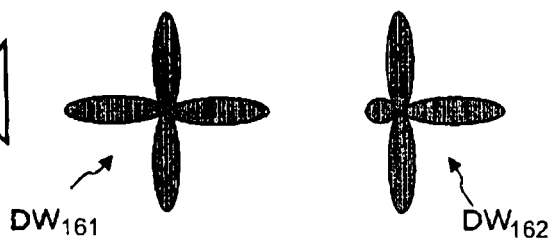

FIG. 1 is a block diagram showing a principle of a wireless communication network system according to the present invention. The present invention relates to a wireless communication network system that mutually relays and transmits various types of signals. As shown in FIG. 1, this wireless communication network system includes more than one wireless communication devices 101 respectively including: a radiating oscillator 1 configured to integrate a transistor into a superhigh-frequency oscillating resonator that generates a negative resistance, and to share the function of an antenna 11 that radiates an electromagnetic wave to space; a baseband signal generating unit 4 that outputs a baseband signal to the radiating oscillator 1; and a reception signal detecting unit 7 that receives a transmitted signal. In the wireless communication network system, the wireless communication devices 101, 102, and 103 are arranged to face each other, so that a pull-in phenomena occurs between the wireless communication devices 101 and 102, and between the wireless communication devices 101 and 103. The signal transmitted from the wireless communication device 101 is transmitted to the other facing wireless communication devices 102 and 103, and the other facing wireless communication devices 102 and 103 receive and extract the signal at the receiving signal detecting units 8 and 9.

In the radiating oscillator 1 shown in FIG. 1, a transistor connected to a resonant structure also serving as the antenna 11 is provided, and the transistor generates a negative resistance at a DC bias voltage supplied from a DC bias power supply 10. The energy supplied from the DC bias power supply 10 is converted into high-frequency oscillation energy by the radiating oscillator 1, and is emitted from the antenna 11 to space.

A radiating oscillator 2 of the wireless communication device 102 and a radiating oscillator 3 of the wireless communication device 103 are basically the same as the radiating oscillator 1 of the wireless communication device 101. However, the components corresponding to the DC bias power supply 10 are not illustrated in FIG. 1. The radiating oscillator 2 of the wireless communication device 102 and the radiating oscillator 3 of the wireless communication device 103 oscillate at a common frequency shared with the radiating oscillator 1 of the wireless communication device 101 by virtue of a pull-in phenomenon of an oscillation frequency, and are in phase synchronization with each other. The baseband signal generating units 4, 5, and 6 connected to the radiating oscillators 1, 2, and 3, respectively, do not simultaneously output baseband signals, but when the baseband signal generating unit 4 connected to the radiating oscillator 1 on the information transmission side outputs a baseband signal, the signal sent out from the radiating oscillator 1 is transmitted to the other facing radiating oscillators 2 and 3, and is extracted by the reception signal detecting units 8 and 9.

In this case, the radiating oscillators 2 and 3 need to be in synchronization with the radiating oscillator 1. If the radiating oscillator 2 is not in synchronization with the radiating oscillator 1 but is in synchronization with the radiating oscillator 3, information cannot be transmitted from the wireless communication device 101 directly to the wireless communication device 102.

Information transmission that is performed where the baseband signal generating unit 4 generates a digital signal such as a square wave is now described. Where the oscillation frequency of the radiating oscillator 1 is $f_1$ when the digital signal is "1", and the oscillation frequency is $f_2$ when the digital signals is "0", the oscillation frequencies of the other facing radiating oscillators 2 and 3 vary in synchronization with the oscillation frequency of the radiating oscillator 1. Accordingly, the oscillation frequencies of the radiating oscillators 2 and 3 respectively have the value of $f_1$ or $f_2$. If the reception signal detecting units 8 and 9 detect the signals of these frequencies, digital information transmission can be completed. Where the original square wave is obtained from the variations of the oscillation frequencies of the radiating oscillators 2 and 3, a circuit (a discriminator) that converts frequency variations into amplitude variations maybe used, or changes in transistor bias conditions inside the radiating oscillators caused by the variations of the oscillation frequencies may be utilized to obtain signals of amplitude variations and perform desired waveform shaping. The output of each baseband generating unit is not limited to the above described digital signal, but may be an analog signal such as voice.

FIG. 2 shows explanatory diagrams of configurations in each of which a radiating oscillator serving as a component of the wireless communication network system according to the present invention has one or more directional beams. FIG. 2(*a*) shows the configuration of a radiating oscillator 12 having a one-side direction radiation pattern. The radiating oscillator 12 radiates an electromagnetic wave of a wide-angle radiation pattern $W_{121}$ with low directivity, using an antenna 121 having a regular planar antenna structure. The radiation pattern $W_{121}$ is represented by a circle in the drawing. The radiating oscillator 12 can radiate an electromagnetic wave of a radiation pattern $DW_{121}$ with a higher directional gain, using additional means such as a lens or a horn. The radiation pattern $DW_{121}$ is represented by an ellipse in the drawing.

FIG. 2(*b*) is a conceptual diagram showing a radiating oscillator 13 with two-way radiation characteristics. Where regular slot-type resonators (antennas 131, 131) or the like are used, a two-way radiation pattern $W_{131}$ can be easily realized. Where the radiating oscillator 13 is configured using additional means such as the above mentioned lens or horn, the directional gain of the radiation pattern $W_{131}$ can be increased like the directional gain of a radiation pattern $DW_{131}$. By using additional means such as the above mentioned lens or horn for one beam side, the directional gain of a pattern such as $DW_{132}$ can be made higher than the directional gain of the other.

FIGS. 2(*c*), 2(*d*), and 2(*e*) show the configurations of radiating oscillators 14, 15, and 16 that radiate electromagnetic waves of multibeam patterns. The radiating oscillator 14 shown in FIG. 2(*c*) is a wireless communication device that radiates an electromagnetic wave of a radiation pattern $DW_{141}$ with a high directional gain in predetermined two directions as if an antenna 141 were provided in two directions at a predetermined angle. This configuration is attained by incorporating an additional structure into the antenna unit that determines the radiation pattern, or modifying the antenna unit.

FIG. 2(*d*) illustrates a case where a wireless communication device having beams in three directions is configured by modifying the antenna that also serves as a resonator of radiating oscillator 15 in a manner different from that in FIG. 2(*c*) or adding a different additional structure from the additional structure added in FIG. 2(*c*). This wireless communication device has a radiation pattern $DW_{151}$ with a directional gain in predetermined three directions as if an antenna 151 were provided in three directions at predetermined angles.

Likewise, a wireless communication device having four-direction beam radiation characteristics shown in FIG. 2(*e*) can be realized by using the radiating oscillator with the two-direction beam radiation pattern illustrated in FIG. 2(*c*) as a two-side radiating oscillator. In this case, the radiating oscillator 16 serves as a wireless communication device having a highly-directional radiation pattern $DW_{161}$ in predetermined four directions. This radiating oscillator 16 radiates electromagnetic waves in the respective directions, and can form wireless links by interacting with the wireless communication devices existing in the respective directions.

Where an electromagnetic wave of a multibeam pattern is radiated, additional means such as the above mentioned lens or horn is used so as to provide a directional gain only in the direction of a desired beam. In this manner, only the directional gain of a desired beam can be increased as in the radiation pattern $DW_{142}$ shown in FIG. 2(*c*), the radiation pattern $DW_{152}$ shown in FIG. 2(*d*), or the radiation pattern $DW_{162}$ shown in FIG. 2(*e*).

The radiating oscillator 12 has a standard configuration that has a unidirectional radiation pattern, and the radiating oscillator 13 has a standard configuration that has a two-way radiation pattern. Further, the above described radiating oscillators 14, 15, and 16 can be realized by utilizing the characteristics obtained through slot structures or patch structures plurally arranged according to an antenna technique.

The radiation patterns shown in FIGS. 2(*a*) through 2(*e*) are conceptual examples of the radiation patterns of electromagnetic waves of radiating oscillators serving as components of the wireless communication network system according to the present invention. In the present invention, it is of course possible to combine conventional multibeam antenna patterns or wide-angle radiation patterns to integrate techniques for forming various types of electromagnetic wave radiation patterns including three-dimensional structures.

FIG. 3 shows example configurations of wireless communication devices that are used in cases where each wireless communication device as a component of the wireless communication network system of the present invention has one or more directional beams, and has the function to change the directions of the beams and the equivalent isotropic radiated power. The directions of the beams and the equivalent isotropic radiated power can be changed to desired characteristics by changing the antenna unit of the radiating oscillator of the wireless communication device or the direction or opening of the lens or horn added to the antenna unit through a mechanical operation. Alternatively, an additional structure that changes the electric length or impedance characteristics through an electric control operation may be provided in the vicinity of the radiating oscillator, or a phased array antenna technique involving a plurality of radiating oscillators may be used so as to control the amplitude of each signal of the radiating face portion and the phase distribution to change the directions of the beams and the equivalent isotropic radiated power.

Figure 3A:
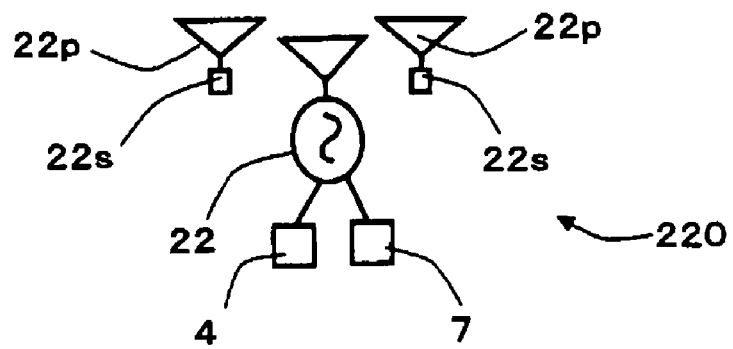
FIGS. 3(a), 3(b), and 3(c) are diagrams showing example configurations of radiating oscillators that are components of a wireless communication network system according to the present invention, each having one or more directional beams and a function to change the direction(s) of the beam(s) and the equivalent isotropic radiated power.

In the wireless communication device 220 shown in FIG. 3(a), a plurality of parasitic antenna elements 22p having impedance varying elements 22s such as diodes or transistors connected thereto are provided around the radiating unit, so as to have an electromagnetic field influence on the radiation of one radiating oscillator 22. Accordingly, a control signal is supplied to a desired one of the impedance varying elements to change the impedance of a desired one of the parasitic antenna elements. In this manner, beam control can be performed.

Figure 3B:
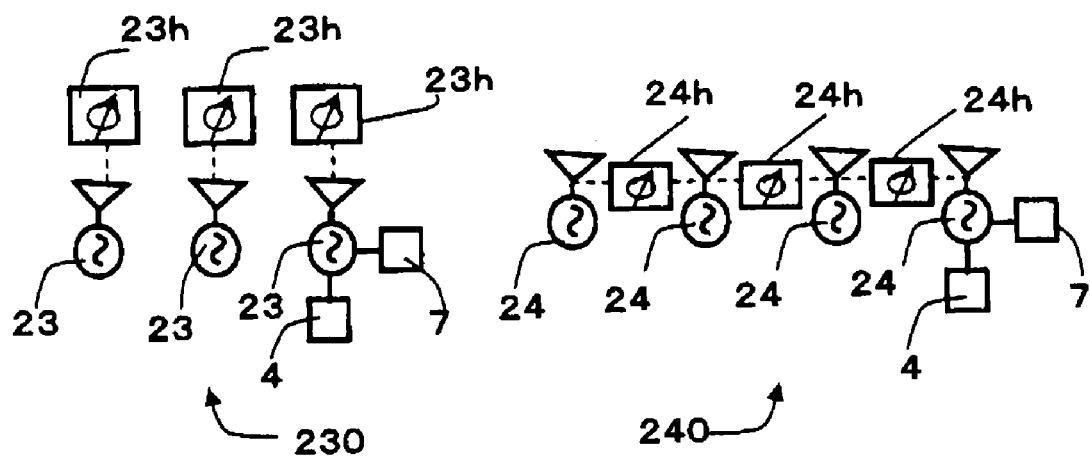

In the wireless communication devices 230 and 240 shown in FIG. 3(b), a plurality of radiating oscillators 23 and 24 are arranged in an array, and are synchronized with one another. Phase shifters 23h and 24h that can electrically control the phase differences among the radiating oscillators are also provided. By this arrangement on the basis of a typical phased array antenna technique, beam control can be performed.

Figure 3C:
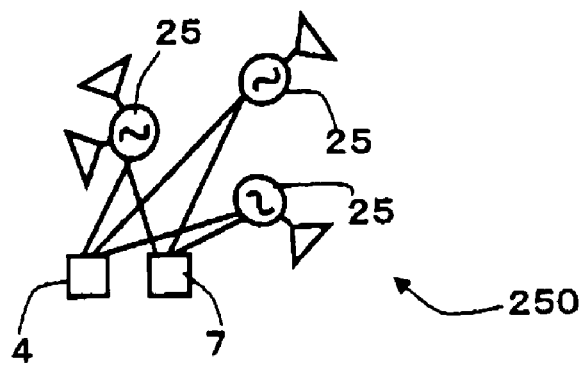

A wireless communication device 250 shown in FIG. 3(c) does not control the amplitude of the signal of the radiating unit or the phase distribution like the wireless communication devices shown in FIGS. 3(a) and 3(b) do. Instead, the wireless communication device 250 includes a plurality of radiating oscillators 25 respectively having a desired stationary beam. Each of the radiating oscillators 25 is configured to direct the beam in a desired direction. Only the radiating oscillator having the beam directed in the desired direction is selected and operated with an external signal. In this manner, beam control can be performed.

Figure 4:
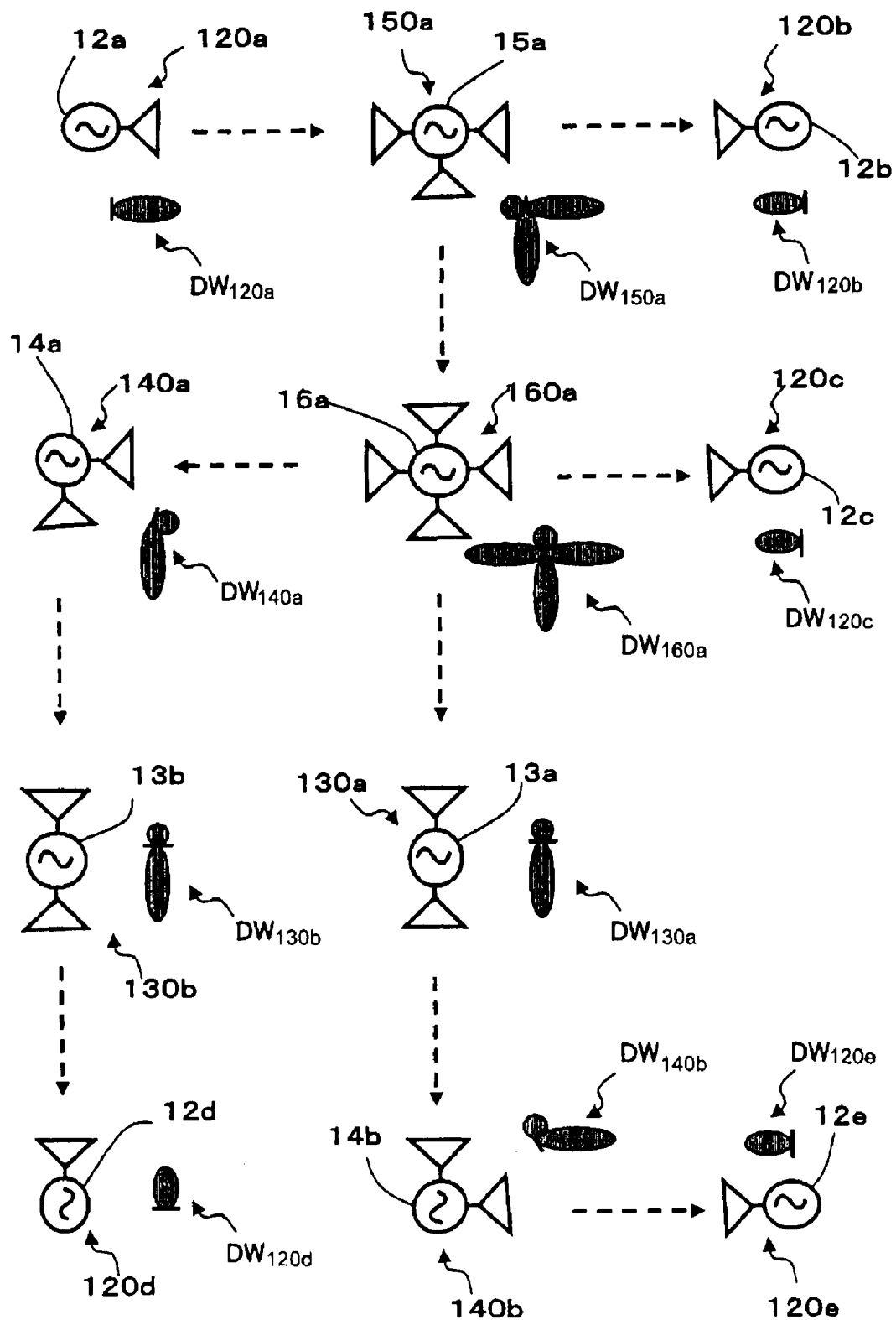
FIG. 4 is a diagram showing an example configuration of a wireless communication network system according to the present invention.
Figure 5:
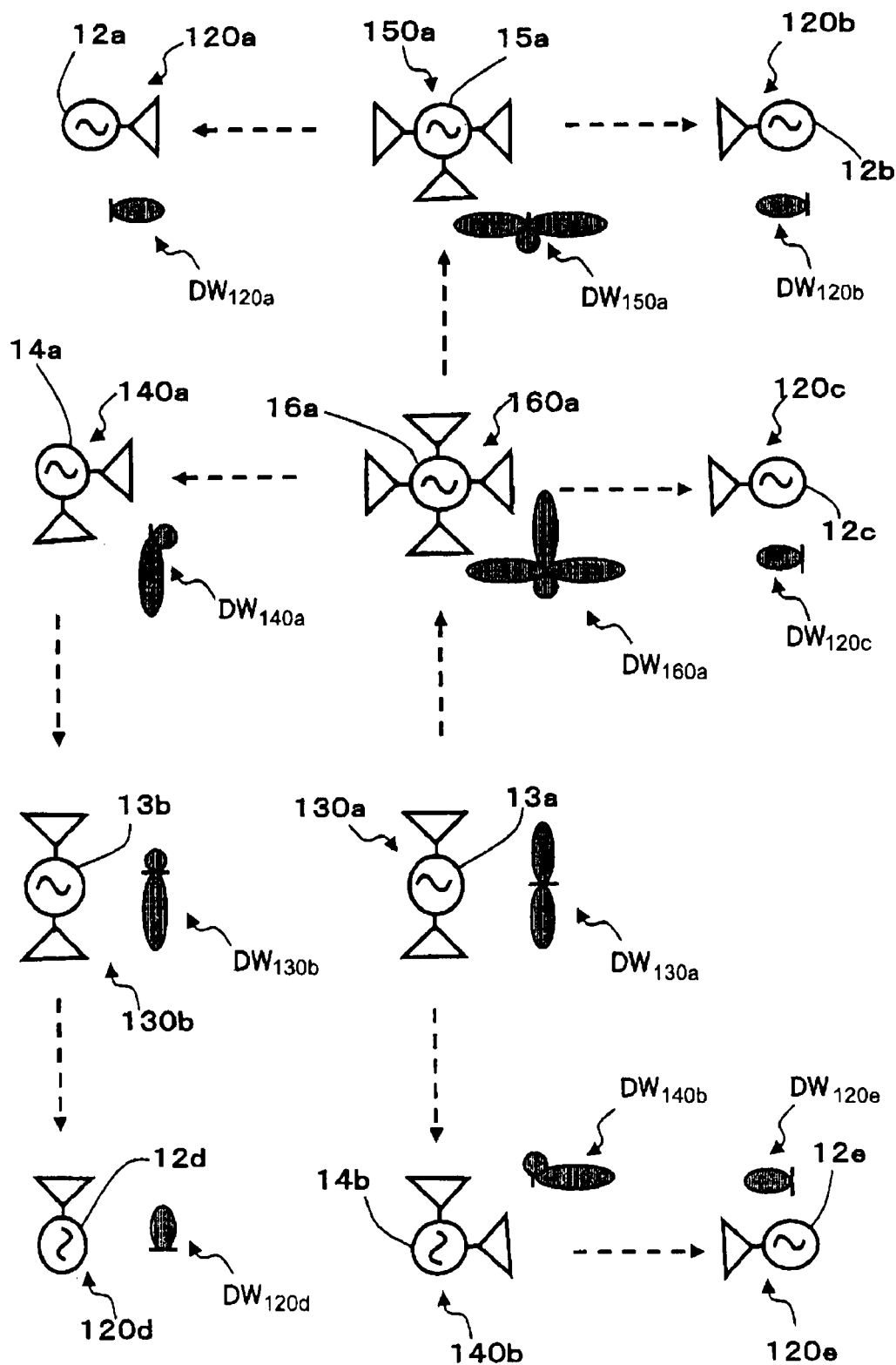
FIG. 5 is a diagram showing another example configuration of a wireless communication network system according to the present invention.
Figure 6:
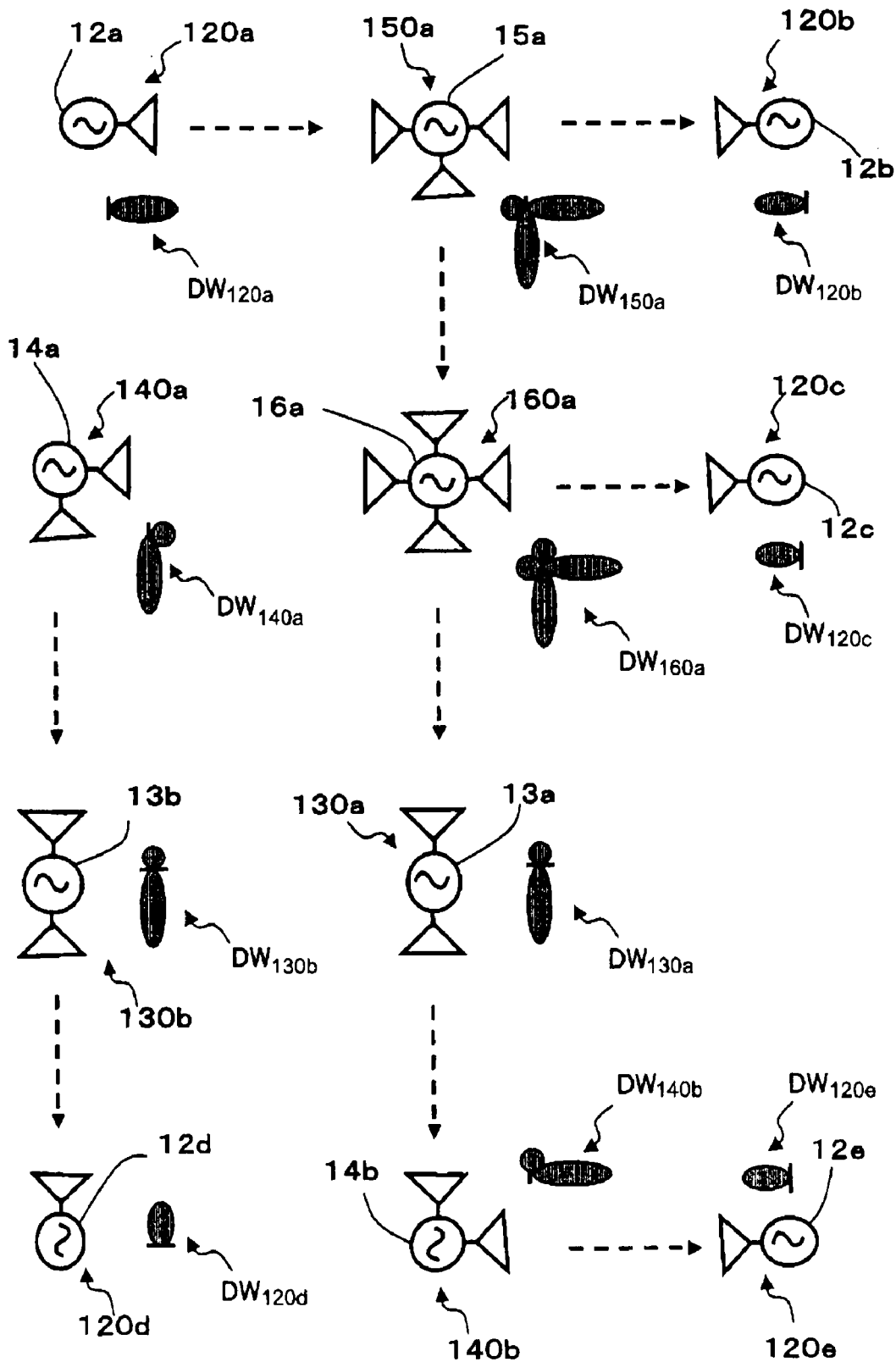
FIG. 6 is a diagram showing yet another example configuration of a wireless communication network system according to the present invention.

FIGS. 4, 5, and 6 illustrate example configurations of wireless communication network systems according to the present invention. Radiating oscillators 12a through 12e of wireless communication devices 120a through 120e forming those wireless communication network systems are configured in the same manner as the radiating oscillator 12 of FIG. 2(a). Radiating oscillators 13a and 13b of wireless communication devices 130a and 130b are configured in the same manner as the radiating oscillator 13 of FIG. 2(b). Radiating oscillators 14a and 14b of wireless communication devices 140a and 140b are configured in the same manner as the radiating oscillator 14 of FIG. 2(c). Radiating oscillators 15a and 15b of wireless communication devices 150a and 150b are configured in the same manner as the radiating oscillator 15 of FIG. 2(d). A radiating oscillator 16a of a wireless communication device 160a is configured in the same manner as the radiating oscillator 16 of FIG. 2(e).

The wireless communication devices 120a through 120e, 130a, 130b, 140a, 140b, 150a, and 160a (hereinafter referred to as "120a through 160a") respectively have basically the same configuration as that of the wireless communication device 101 of FIG. 1. However, the baseband signal generating units, the reception signal detecting units, and the DC bias power supplies are not illustrated in the drawings, for convenience sake. The wireless communication devices 120a through 160a have radiation patterns DW 120a 120a through $DW_{160a}$, respectively.

FIG. 4 shows an example configuration of a wireless communication network system in which the wireless communication device 120a is an information transmitter. The radiating oscillator 15a of the wireless communication device 150a is in synchronization with the radiating oscillator 12a of the wireless communication device 120a, and the radiating oscillators 12b and 16a of the wireless communication devices 120b and 160a are in synchronization with the radiating oscillator 15a of the wireless communication device 150a. Although explanation of the relationships with respect to synchronization is omitted in the following description, the synchronization relationships are indicated by the broken-line arrows in FIG. 4. The radiating oscillators 12a through 12e, 13a, 13b, 14a, 14b, 15a, and 16a are all in synchronization, and all oscillate at the same frequency. If the oscillation frequency of the radiating oscillator 12a is changed, the oscillation frequencies of the other radiating oscillators 12b through 12e, 13a, 13b, 14a, 14b, 15a, and 16a in synchronization with the radiating oscillator 12a are also changed, and the change is used as information. Accordingly, the information from the wireless communication device 120a as the information transmitter is transmitted to the other wireless communication devices 120b through 160a, and is shared in the wireless communication network.

FIG. 5 shows an example configuration of a wireless communication network system in which the wireless communication device 130a is an information transmitter. In this case, the radiating oscillator 16a of the wireless communication device 160a and the radiating oscillator 14b of the wireless communication device 140b are in synchronization with the radiating oscillator 13a of the wireless communication device 130a. The relationships with respect to this synchronization are indicated by the broken-line arrows in FIG. 5. Here, the radiation patterns $DW_{130a}$, $DW_{160a}$, and $DW_{150a}$ of the wireless communication devices 130a, 160a, and 150a in FIG. 5 differ from those in FIG. 4 in directionality and angle though the same reference numerals are used.

FIG. 6 shows an example configuration of a wireless communication network system in which the wireless communication devices 120a and 140a serve as information transmitters. In FIG. 6, the radiation pattern $DW_{160a}$ of the wireless communication device 160a differs from that in FIG. 4 in directionality and angle though the same reference numeral is used. The synchronization between the wireless communication device 160a and the wireless communication device 140a is not secured. In this case, the wireless communication network system having the wireless communication device 120a as the information transmitter and the wireless communication network system having the wireless communication device 140a as the information transmitter can be used as wireless communication network systems that are independent of each other.

In each wireless communication network system of the present invention, if each wireless communication device has one or more directional beams and has the function to change the directions of the beams and the equivalent isotropic radiated power, synchronization by virtue of a pull-in phenomenon can be secured or cancelled in a variable manner in each wireless communication device. More specifically, strong electric power is selectively supplied only to a wireless communication device to be newly kept in synchronization among the other wireless communication devices existing in different spots, so that a pull-in phenomenon is caused. Meanwhile, the electric power to be supplied to a wireless communication device that does not need to be kept in synchronization is weakened, so that the pull-in phenomenon is cancelled. In this manner, the wireless communication devices on the other side that are kept in synchronization can be changed. For example, the state of the wireless communication network system illustrated in FIG. 4 can be changed to the state illustrated in FIG. 5 or 6, and the information transmission route and the information transmitting direction can be changed in the wireless communication network. Accordingly, a more flexible network can be effectively formed.

In a wireless communication network of the present invention, a wireless communication device that does not include any of or one of a baseband signal generating unit and a reception signal detecting unit may be provided in the wireless communication network so that the wireless communication device serves as a wireless communication device specified for a relay function, an information transmitting function, or an information receiving function, as needed. In this manner, a wireless communication network system can be formed with a minimum hardware configuration that has no unnecessary parts and is suitable for intended use.

For example, if the wireless communication device 120a of FIG. 4 is a device specified for information transmission, there is no need to provide a reception signal detecting unit in the wireless communication device 120a. If the wireless communication device 130a of FIG. 4 is a device specified for a relay function, there is no need to provide a baseband signal generating unit and a reception signal detecting unit in the wireless communication device 130a. If the wireless communication device 120e of FIG. 4 is a device specified for information reception, there is no need to provide a baseband signal generating unit in the wireless communication device 120e.

The wireless communication devices constituting a wireless communication network system of the present invention have high efficiency and can operate with a supply of low electric power of several tens of milliwatts or less. Accordingly, instead of a DC bias power supply, a power generation system or an energy conversion system such as a microwave power transmitter or a solar cell, or small-sized, light-weight power supply means such as a lithium cell or a hydrogen cell may be used to supply a very small amount (10 mW to 20 mW) of electric power to each wireless communication device. According to this arrangement, the wireless communication network system of the present invention can be configured to continuously operate. This is effective for wireless communication devices that are placed in places where electric power distribution is difficult.

Each of the baseband signal generating units of the plurality of wireless communication devices constituting a wireless communication network system of the present invention has the function to superpose a unique address signal, and can identify which wireless communication device a signal is transmitted from.

The following is a description of a specific example of a basic circuit of a wireless communication device in a wireless communication network system according to the present invention and the operating principle of the basic circuit, as well as the results of an experiment conducted on the wireless communication device.

Figure 7:
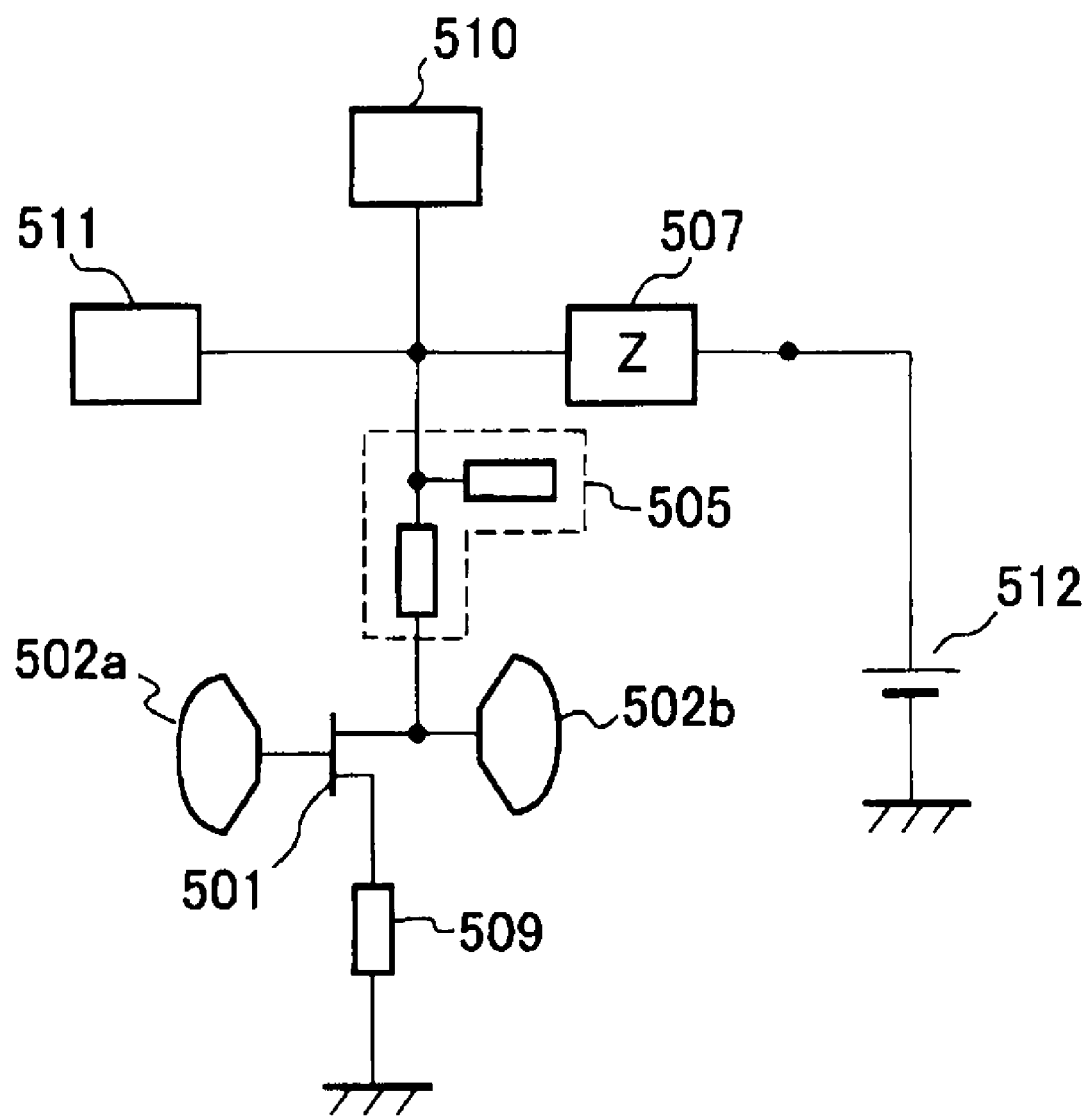
FIG. 7 shows a specific example of a basic circuit of a wireless communication device of a wireless communication network system according to the present invention.

FIG. 7 shows a specific example of the basic circuit of a wireless communication device in a wireless communication network system according to the present invention. A conductor patch 502a is connected to the gate of a transistor 501, and a conductor patch 502b and a RF choke circuit 505 for supplying a drain voltage are connected to the drain of the transistor 501. A baseband frequency load 507 is connected in series between the RF choke circuit 505 and a DC bias power supply 512. The source of the transistor 501 is grounded via an impedance line 509 that satisfies oscillation conditions. A reception signal output unit 510 and a baseband signal generating unit 511 are connected to a node 515 between the RF choke circuit 505 and the baseband frequency load 507.

In this basic circuit, the conductor patches 502a and 502b and the transistor 501 correspond to a high-frequency unit including the primary radiator functions of the radiating oscillator 1 and the antenna 11 of FIG. 1, and function as a high-frequency signal generator in cooperation with the baseband signal generating unit 511 corresponding to the baseband signal generating unit 4. At the same time, this high-frequency unit also functions as a signal detector by virtue of the baseband frequency load 507 and the RF choke circuit 505, and, in cooperation with the reception signal output unit 510, corresponds to the reception signal detecting unit 7. The DC bias power supply 512 corresponds to the DC bias power supply 10, and an additional structure is incorporated into the conductor patch 502a and the conductor patch 502b. In this manner, the directional characteristics of the antenna 11 are determined.

Next, the operating principle of the wireless communication device is described.

A negative resistance is generated in the transistor 501 by virtue of DC energy supplied from the DC bias power supply 512. The negative resistance and the conductor patches 502a and 502b that are resonant structures serving as antennas cause an oscillating phenomenon at a certain resonance frequency. High-frequency energy is generated and then radiated to space, which is a high-frequency signal. If a signal is output from the baseband signal generating unit 511, the bias conditions of the oscillating transistor 501 vary, and the oscillation frequency varies accordingly. Meanwhile, a high-frequency signal transmitted from outside is input to the wireless communication device, and a synchronized state is created by a pull-in phenomenon. As a result, the frequency of the high-frequency signal from outside varies. In such a case, the bias conditions of the oscillating transistor 501 also vary. The variation in the bias conditions is detected through the baseband frequency load 507, and a reception signal is output from the reception signal output unit 510. In FIG. 7, the function corresponding to the reception signal detecting unit 7 of the wireless communication device 101 of FIG. 1 is realized by the oscillating transistor 501 and the baseband frequency load 507. This implies that each radiating oscillator also serves as part of a demodulating function to convert a frequency change into an amplitude change.

Next, the results of a wireless transmission experiment conducted on the wireless communication network system shown in FIG. 1 actually formed are described.

Three wireless communication devices (101, 102, and 103) respectively having the configuration illustrated in FIG. 7 are formed as samples, and an experiment is conducted by transmitting information from the wireless communication device 101 to the wireless communication devices 102 and 103. The radiating oscillators 1 through 3 in the wireless communication devices 101 through 103 operate in a microwave band (the oscillation frequency in a case where there is not a baseband signal input is 11.3 GHz). First, a radiated signal from the radiating oscillator 1 is input to the radiating oscillators 2 and 3, and the radiating oscillators 2 and 3 are synchronized with the radiating oscillator 1. The radiating oscillators 1 through 3 then oscillate at the same frequency.

Figure 8A:
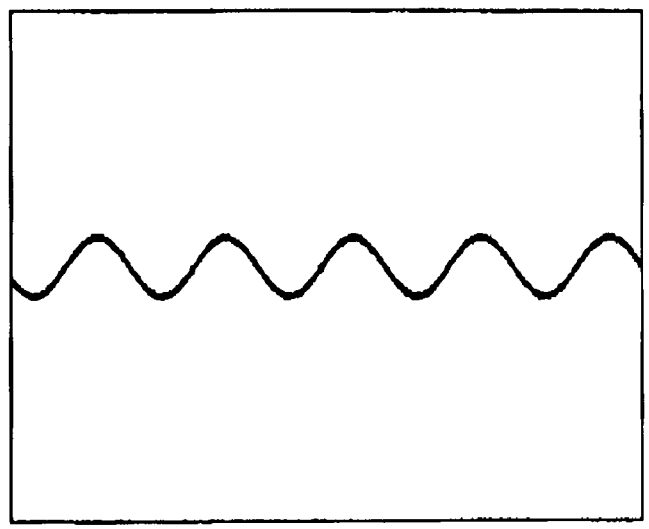
FIGS. 8(a), 8(b), and 8(c) show time-axis waveforms of the baseband signal generating units of wireless devices on the transmission side that are observed in cases where a wireless communication network is actually formed and a wireless transmission experiment is conducted.
Figure 8B:
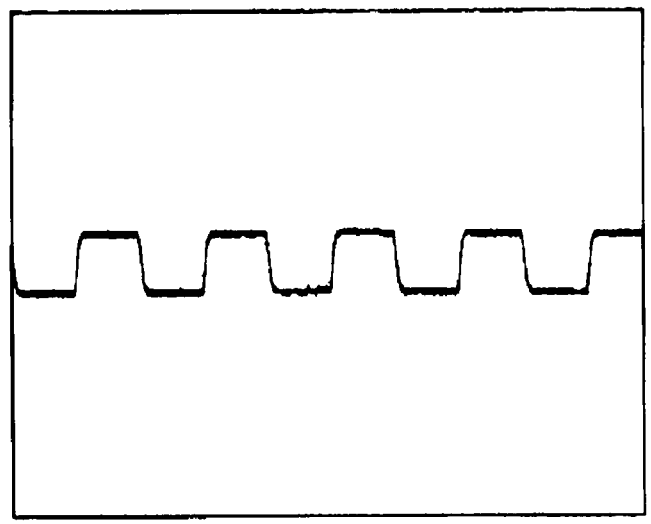
Figure 8C:
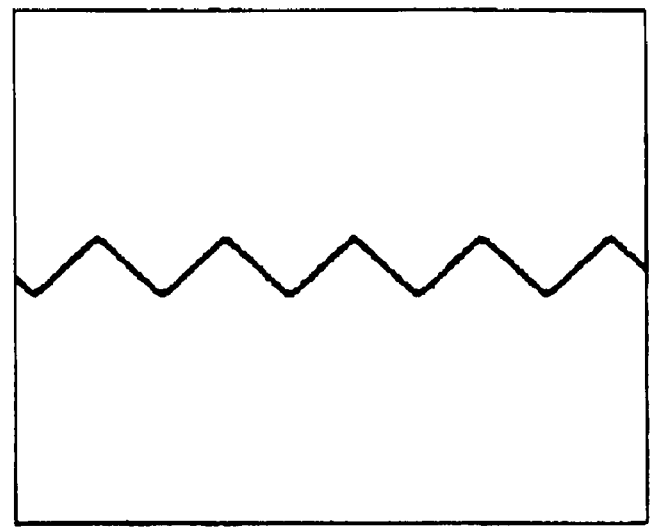
Figure 9A:
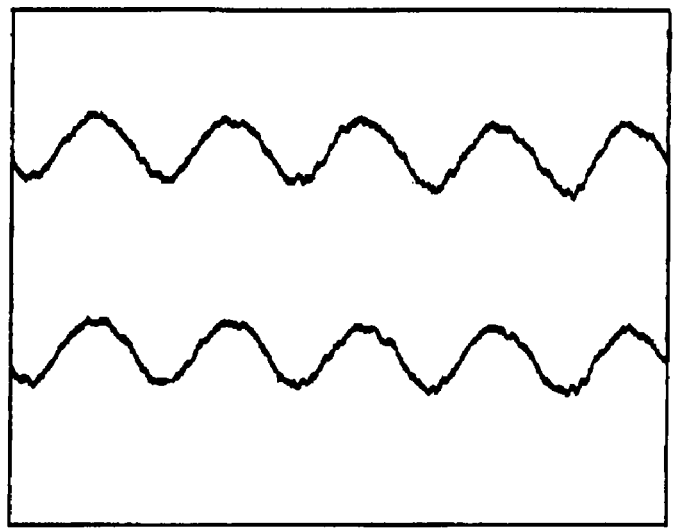
FIGS. 9(a), 9(b), and 9(c) are time-axis waveforms of the reception signal detecting units that are observed in cases where a wireless communication network system is actually formed, and a wireless transmission experiment is conducted.
Figure 9B:
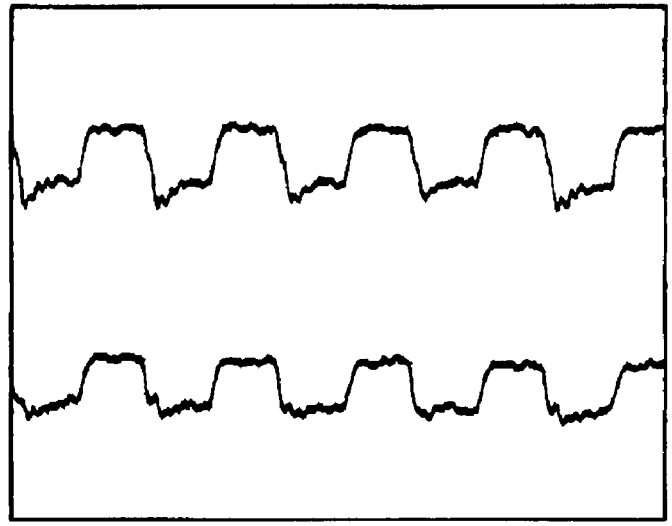
Figure 9C:
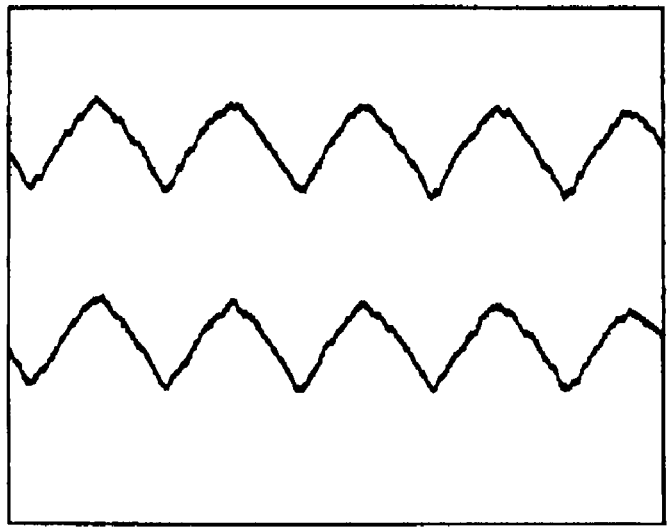

The sine-wave signal (1 MHz in frequency, 100 mV$_{p-p}$ in voltage) shown in FIG. 8(a) was input from the baseband signal generating unit 4 of the wireless communication device 101, and a change was caused in the high-frequency oscillation signal frequency. FIG. 9(a) shows the results (a display of an oscilloscope) of time-axis waveform measurement carried out on the reception signal detecting units 8 and 9 of the wireless communication devices 102 and 103 in the above case. The upper and lower waveforms in FIG. 9(a) are the time-axis waveforms of the reception signal detecting units 8 and 9, respectively, and it can be seen from the waveforms that the sine-wave signal from the baseband signal generating unit 4 of the wireless communication device 101 is demodulated in the wireless communication devices 102 and 103. Likewise, the square-wave signal shown in FIG. 8(b) and the triangle-wave signal (1 MHz in frequency, 100 mV$_{p-p}$ in voltage) shown in FIG. 8(c) were input from the baseband signal generating unit 4, and high-frequency oscillation signals were generated. FIGS. 9(b) and 9(c) show the results of these cases. As can be seen from the results, the signal waveform that is input from the baseband signal generating unit 4 is reproduced by the reception signal detecting units 8 and 9 in each case, and that information is successfully transmitted from the wireless communication device 101 to the wireless communication devices 102 and 103.

Industrial Applicability:

Since a wireless network system according to the present invention utilizes synchronization caused by a pull-in phenomenon of a radiating oscillator as information sharing means in a network, the wireless network system can secure relatively high-quality information transmission, though it has a very simple structure. Also, in a planar radiating oscillator that has a transistor satisfying the negative resistance oscillating conditions, it is possible to expect efficiency 20 to 30 times as high as the efficiency achieved in a case where a Gunn diode is used, and the power consumption can be reduced. Accordingly, wireless communication devices that can operate with batteries can be provided as inexpensive components, and practical use of wireless communication network systems can be expected.

The invention claimed is:

1. A wireless communication network system that mutually relays and transmits various types of signals, comprising
    a plurality of wireless communication devices distributed and arranged, each comprising:
        a radiating oscillator having a configuration of a transistor integrated with a resonator for a superhigh-frequency oscillation, which generates a negative resistance and commonly gives an antenna function emitting an electromagnetic wave to space;
        a baseband signal generator that outputs a baseband signal to the radiating oscillator; and
        a receiving signal detector that receives a transmitted signal, wherein
    each of the wireless communication devices has one directional beam or a plurality of directional beams,
    the wireless communication devices are arranged between at least one of other wireless communication devices for the directional beams to face each other at a location where a pull-in phenomenon is caused, and
    a signal transmitted from one of the wireless communication devices is an oscillation signal of the radiating oscillator of the one of the wireless communication devices, a frequency of the oscillation signal varies with the baseband signal, a variation in the frequency is transmitted to the other ones of the facing wireless communication devices by the pull-in phenomenon, oscillation frequencies of the radiating oscillators of the other ones of the facing wireless communication devices vary, and the other ones of the facing wireless communication devices extract the variation by receiving the variation in the frequency through the receiving signal detector.

2. A wireless communication network system that mutually relays and transmits various types of signals, comprising
    a plurality of wireless communication devices distributed and arranged, each comprising:
        a radiating oscillator having a configuration of a transistor integrated with a resonator for a superhigh-frequency oscillation, which generates a negative resistance and commonly gives an antenna function emitting an electromagnetic wave to space;
        a baseband signal generator that outputs a baseband signal to the radiating oscillator; and
        a receiving signal detector that receives a transmitted signal, wherein
    each of the wireless communication devices has one directional beam or a plurality of directional beams,
    the wireless communication devices are arranged between at least one of other wireless communication devices for the directional beams to face each other at a location where a pull-in phenomenon is caused,
    a signal transmitted from one of the wireless communication devices is an oscillation signal of the radiating oscillator of the one of the wireless communication devices, a frequency of the oscillation signal varies with the baseband signal, a variation in the frequency is transmitted to the other ones of the facing wireless communication devices by the pull-in phenomenon, oscillation frequencies of the radiating oscillators of the other ones of the facing wireless communication devices vary, and the other ones of the facing wireless communication devices extract the variation by receiving the variation in the frequency through the receiving signal detector, and
    each of the baseband signal generators of the wireless communication devices has a function to connect to a signal transmitted from various sensors or another sensor network and transfer acquired data of the signal.

3. A wireless communication network system that mutually relays and transmits various types of signals, comprising
    a plurality of wireless communication devices distributed and arranged, each comprising:
        a radiating oscillator having a configuration of a transistor integrated with a resonator for a superhigh-frequency oscillation, which generates a negative resistance and commonly gives an antenna function emitting an electromagnetic wave to space;
        a baseband signal generator that outputs a baseband signal to the radiating oscillator; and
        a receiving signal detector that receives a transmitted signal, wherein
    each of the wireless communication devices has one directional beam or a plurality of directional beams,
    the wireless communication devices are arranged between at least one of other wireless communication devices for the directional beams to face each other at a location where a pull-in phenomenon is caused,
    a signal transmitted from one of the wireless communication devices is an oscillation signal of the radiating oscillator of the one of the wireless communication devices, a frequency of the oscillation signal varies with the baseband signal, a variation in the frequency is transmitted to the other ones of the facing wireless communication devices by the pull-in phenomenon, oscillation frequencies of the radiating oscillators of the other ones of the facing wireless communication devices vary, and the other ones of the facing wireless communication devices extract the variation by receiving the variation in the frequency through the receiving signal detector, and
    one of the wireless communication devices has or the wireless communication devices have a function to change a direction of the beam or directions of the beams and equivalent isotropic radiated power.

4. The wireless communication network system according to any of claims 1 to 3, wherein
each of the baseband signal generators of the wireless communication devices has a function to superpose a unique address signal and is configured to be capable of identifying which one of the wireless communication devices a signal is transmitted from.

5. The wireless communication network system according to any of claims 1 to 3, wherein
at least one of the wireless communication devices does not include any of or one of the baseband signal generator and the receiving signal detector.

6. The wireless communication network system according to any of claims 1 to 3, which is connected to a cable network or another wireless communication network, and is integrally controlled and managed.

* * * * *